(12) United States Patent
Brittingham et al.

(10) Patent No.: US 8,074,773 B2
(45) Date of Patent: Dec. 13, 2011

(54) DEVICE AND METHOD FOR SECURING AND REMOVING A DISK BRAKE ROTOR TO A WHEEL HUB

(75) Inventors: Todd Anthony Brittingham, White Lake, MI (US); J. Christopher Oakwood, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 848 days.

(21) Appl. No.: 12/141,035

(22) Filed: Jun. 17, 2008

(65) Prior Publication Data

US 2009/0308703 A1 Dec. 17, 2009

(51) Int. Cl.
*B60T 1/06* (2006.01)
(52) U.S. Cl. ............... 188/18 A; 188/218 XL; 188/73.2
(58) Field of Classification Search ............. 188/18 A, 188/218 XL, 73.2, 218 R, 73.31, 250 G
See application file for complete search history.

(56) References Cited

U.S. PATENT DOCUMENTS

| | | | |
|---|---|---|---|
| 5,769,185 A * | 6/1998 | Main et al. | 188/18 A |
| 5,899,305 A | 5/1999 | Austin et al. | |
| 6,076,896 A | 6/2000 | Bertetti et al. | |
| 6,464,045 B2 | 10/2002 | Weber et al. | |
| 6,604,613 B2 | 8/2003 | Burgoon et al. | |
| 6,619,440 B2 * | 9/2003 | Antony et al. | 188/18 A |
| 6,851,759 B2 | 2/2005 | Meeker et al. | |
| 6,880,218 B2 | 4/2005 | Christopher | |
| 6,997,292 B2 | 2/2006 | Burgoon et al. | |

* cited by examiner

Primary Examiner — Melanie Torres Williams
(74) Attorney, Agent, or Firm — O'Brien Jones, PLLC

(57) ABSTRACT

A disc brake assembly comprising a brake rotor including a rotor flange having a circular countersink extending through a thickness of the rotor flange, with a smooth, beveled outer portion for receiving a rotor retention screw in a recessed position, and a threaded inner portion for receiving a prying screw; and a wheel hub including a hub flange having a circular bore for the rotor retention screw extending through a thickness of the hub flange, the circular bore having a threaded inner portion for receiving the rotor retention screw from the countersink for securing the brake rotor to the wheel hub. A diameter of the inner portion or the circular countersink is larger then a diameter of the circular bore to allow insertion of the prying screw into the circular countersink but not into the circular bore.

20 Claims, 4 Drawing Sheets

DEVICE AND METHOD FOR SECURING AND REMOVING A DISK BRAKE ROTOR TO A WHEEL HUB

DESCRIPTION OF THE INVENTION

1. Field of the Invention

The present invention relates generally to a device and method for securing a brake rotor to a wheel hub that can provide an improved connection between the rotor and the hub, and can provide a prying feature for ease of disassembly, for example during servicing.

2. Background of the Invention

Virtually all modern cars and most modern trucks employ disc brake systems on at least their front wheels. With disc brakes, when a driver depresses the brake pedal to slow or stop a vehicle, a hydraulic system forces friction material, in the form of brake pads, against each side of a disc-shaped, metallic brake rotor. The rotor is attached to the vehicle at a wheel hub, which is connected to the vehicle's suspension system. A wheel is then attached to the brake rotor and firmly secured by lug nuts. In order to maximize the life of the disc brake system, it is advantageous to secure the rotor directly to the hub, so that a tight connection is maintained between the rotor and the hub even when a wheel is not attached to the rotor.

During the assembly and manufacture of a vehicle, the corner sub-assembly, including the brake rotor and wheel hub, is typically manufactured and assembled at one location and then transported to another location for assembly with the wheels and other remaining vehicle components. Securing the brake rotor directly to the wheel hub prior to transport can help prevent damage to the rotor and adjacent components during shipment, and preclude debris or other extraneous matter from getting lodged between the rotor and the hub prior to final assembly. A driver or mechanic may also remove a wheel from a vehicle during normal maintenance and servicing. Securing the brake rotor directly to the wheel hub can further help prevent debris from lodging between the rotor and the hub if a wheel is removed. Any contamination between the rotor and the hub can lead to increased or excessive lateral run-out of the brake rotor, generating undesirable pulsations of the brakes or vehicle vibrations during braking.

Because brake rotors are designed to rub against the brake pads, they are prone to wearing out, and eventually must be replaced. Merely removing the rotor retention screw(s) holding the rotor to the hub often does not facilitate separation of the rotor from the wheel hub. Over time, the brake rotor can develop a mechanical bond to the wheel hub due to buildup of dirt, corrosion, and other contaminants. Because of this, the brake rotor must be forcefully removed from the vehicle. Techniques for removing the rotor include, but are not limited to, hammering, prying, using hub pullers, lubricants, torches, and other extraneous methods. However, many of these techniques are likely to damage the rotor as well as other components of the wheel assembly, and are, therefore, unsatisfactory. Thus it is beneficial to design in a feature to the rotor that allows for prying the rotor from the wheel hub without damaging either the rotor or any surrounding wheel end components.

Prior devices and methods have confronted the problem of maintaining a tight connection between a rotor and a hub during shipment, assembly, and vehicle maintenance. While others have separately addressed the problem of removing a rotor that has become stuck to a wheel hub. No device or method has yet to incorporate both functions into one feature, thereby simplifying the design of the brake rotor and reducing costs associated with machining two separate features into the disk brake assembly.

SUMMARY OF THE INVENTION

In accordance with certain embodiments of the present teachings, the present invention provides a disk brake assembly comprising a brake rotor including a rotor flange having a circular countersink extending through a thickness of the rotor flange, with a smooth, beveled outer portion for receiving a rotor retention screw in a recessed position, and a threaded inner portion for receiving a prying screw; and a wheel hub including a hub flange having a circular bore for the rotor retention screw extending through a thickness of the hub flange, the circular bore having a threaded inner portion for receiving the rotor retention screw for securing the brake rotor to the wheel hub. A diameter of the inner portion of the circular countersink is larger then a diameter of the circular bore to allow insertion of the prying screw into the circular countersink but not into the circular bore.

In accordance with certain embodiments of the present teachings, the present invention additionally provides a method of securing a disk brake rotor to a wheel hub, comprising providing a brake rotor having a circular countersink adapted for receiving a rotor retention screw and a prying screw; providing a wheel hub having a circular bore adapted for receiving the rotor retention screw; aligning the circular countersink in the brake rotor with the circular bore in the wheel hub; and inserting the rotor retention screw through the aligned holes so that a head of the rotor retention screw engages a smooth, beveled outer portion of the countersink, and a threaded shaft of the rotor retention screw engages the circular bore.

Certain embodiments of the present teachings also provide a method for manufacturing a disk brake rotor that can be secured to a wheel hub, comprising fabricating a brake rotor including: an annular flange having a wheel hub receiving surface adapted for abutting a wheel hub; and a circular countersink extending through a thickness of the flange, with a smooth, beveled outer portion for receiving a rotor retention screw for securing the wheel hub against the wheel hub receiving surface of the flange, and a threaded inner portion for receiving a prying screw for ease of disassembly during service.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

The integration of a rotor attachment function and a rotor removal function into one feature of a disk brake assembly can not only simplify the design of the brake assembly, but can also reduce the machining costs associated with machining two separate features into the brake assembly.

To attach and secure a brake rotor to a wheel hub, exemplary embodiments of the present teachings contemplate inserting a rotor retention screw through a countersink in a brake rotor and into an aligned rotor retention screw hole in a wheel hub. To later remove the brake rotor from the wheel hub, exemplary embodiments of the present teachings further contemplate removing the rotor retention screw and then inserting a prying screw into the countersink in the brake rotor to press the rotor away from and off of the adjacent wheel hub. The design of the countersink enables the rotor retention screw and the prying screw to utilize the same machined hole in the brake rotor.

Figure 1:
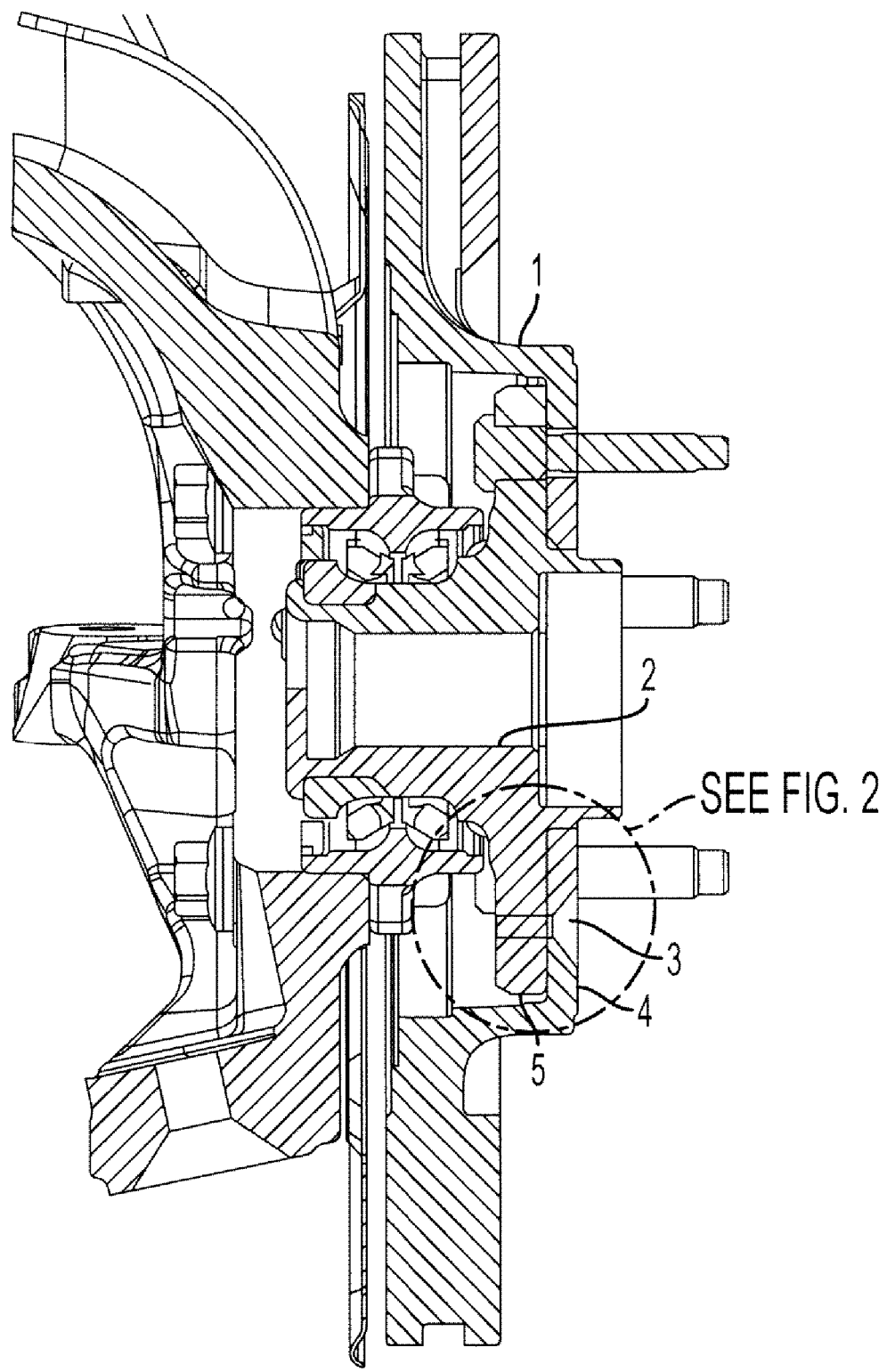
FIG. 1 is a partial side view in section of a disk brake assembly with a brake rotor secured to a wheel hub in accordance with exemplary embodiments of the present teachings.

FIG. 1 shows a partial side view in section of an exemplary disk brake assembly in accordance with the present teachings. A rotor flange 4 of a brake rotor 1 is secured to a hub flange 5 of a wheel hub 2 by a rotor retention screw 3.

Figure 2:
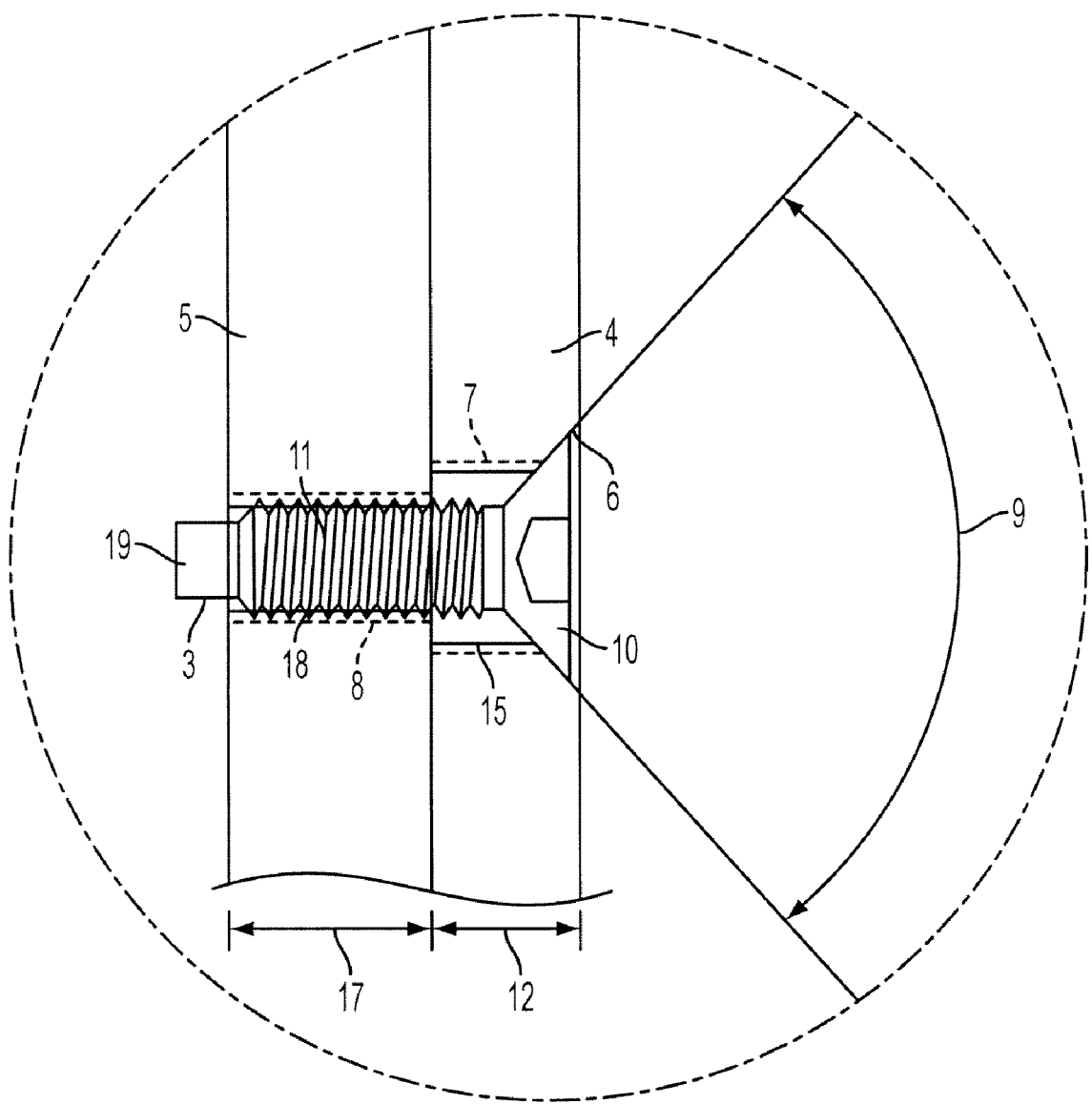
FIG. 2 is an enlarged view of the disk brake assembly of FIG. 1.

FIG. 2 is an enlarged view of the disk brake assembly of FIG. 1. The rotor flange 4 has a circular countersink 15 that extends through its entire thickness 12. The circular countersink has a smooth, beveled outer portion 6 that leads to a threaded inner portion 7. The outer portion 6 has a degree of bevel 9. The hub flange 5 has a circular bore 8 for the rotor retention screw 3 that extends through its entire thickness 17. The circular bore 8 for the rotor retention screw 3 has a threaded inner portion 18.

In accordance with certain embodiments of the present teachings, the rotor flange 4 and the hub flange 5 are aligned so that a rotor retention screw 3 can be inserted through the countersink 15 and into the circular bore 8. The rotor retention screw 3 can be recessed in the countersink 15 and a head 10 of the screw 3 can engage the outer portion 6 of the countersink 15, while a threaded shaft 11 of the screw 3 engages the threaded inner portion 18 of the circular bore 8. Certain embodiments of the present teachings contemplate the outer portion 6 having a 90 degree bevel for the degree of bevel 9, and the threaded inner portion 18 having a M8×1.25-6H thread to accommodate a M8×20 mm, flat head screw for the rotor retention screw 3. At a 90 degree bevel, the flathead screw can be countersunk into the countersink 15 to provide a smooth surface area of the rotor flange 4.

In accordance with further embodiments of the present teachings, the degree of bevel 9 and the threaded inner portion 18 may be sized to accommodate a variety of types and sizes of rotor retention screws. The rotor retention screw may include any existing screw or bolt, such as, for example, a socket flathead screw, a machine bolt, or an oval head machine screw with either a Phillips, slotted, or combination head. The rotor retention screw may further include any prospective spirally grooved, solid cylinder that can be used to secure the brake rotor to the wheel hub, as would be understood by one skilled in the art.

Certain embodiments of the present invention further contemplate using a piloted screw for the rotor retention screw 3, which provides a tip 19 of the rotor retention screw 3 for guiding the rotor retention screw 3 into the circular bore 8.

Figure 3:
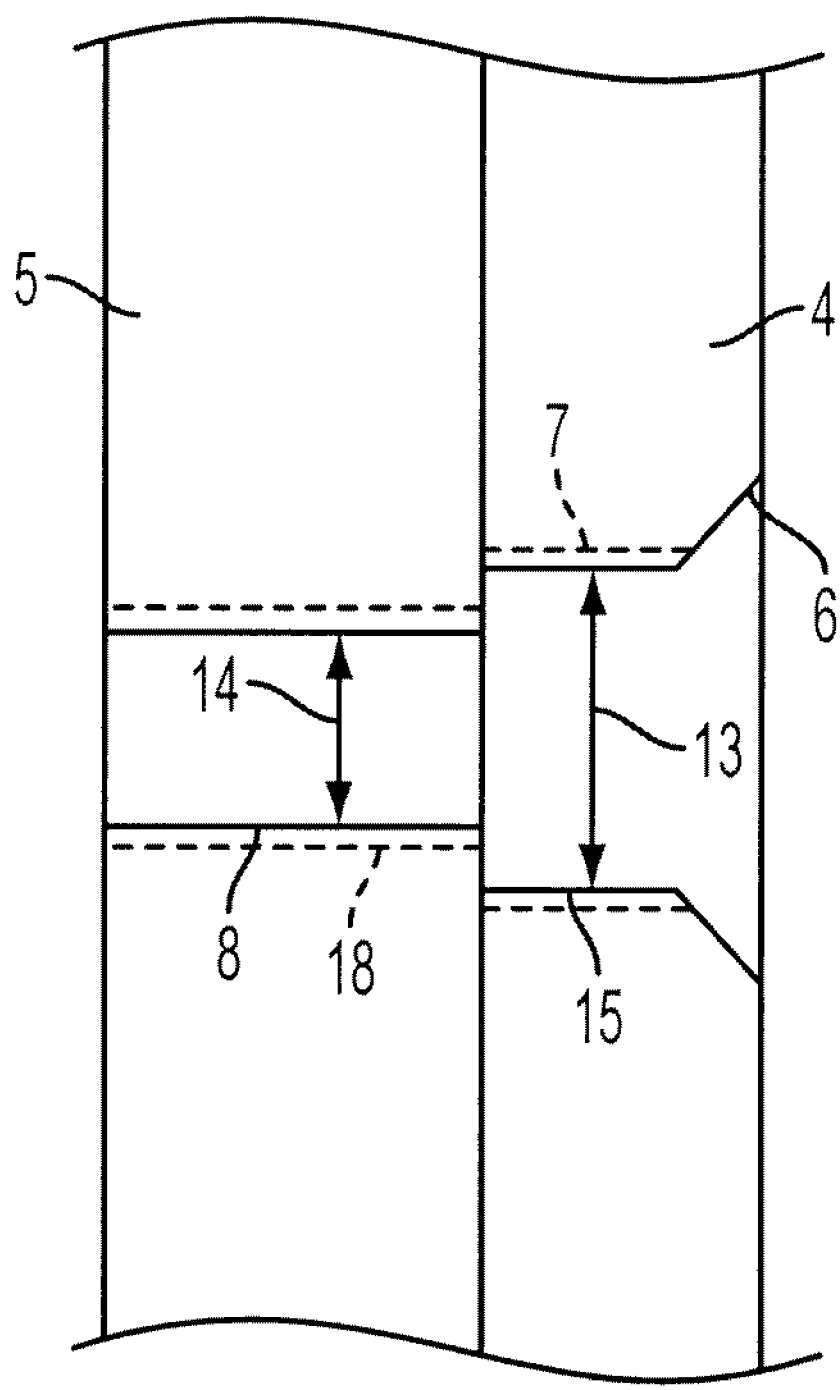
FIG. 3 is an enlarged side view in section of the disk brake assembly of FIG. 1 with the rotor retaining screw removed.

FIG. 3 is an enlarged side view of the disk brake assembly of FIG. 1, with the rotor retention screw 3 removed. A diameter 13 of the threaded inner portion 7 of the countersink 15 is proportionally larger than a diameter 14 of the circular bore 8. In certain exemplary embodiments, the diameter 13 may be about 25% larger than the diameter 14; however, it is to be understood that the diameter 13 need only be large enough to allow clearance for the retention screw. Further embodiments of the present teachings contemplate additional relationships between the diameter 13 and the diameter 14, which allow the insertion of a prying screw into the countersink 15 but not into the circular bore 8.

Figure 4:
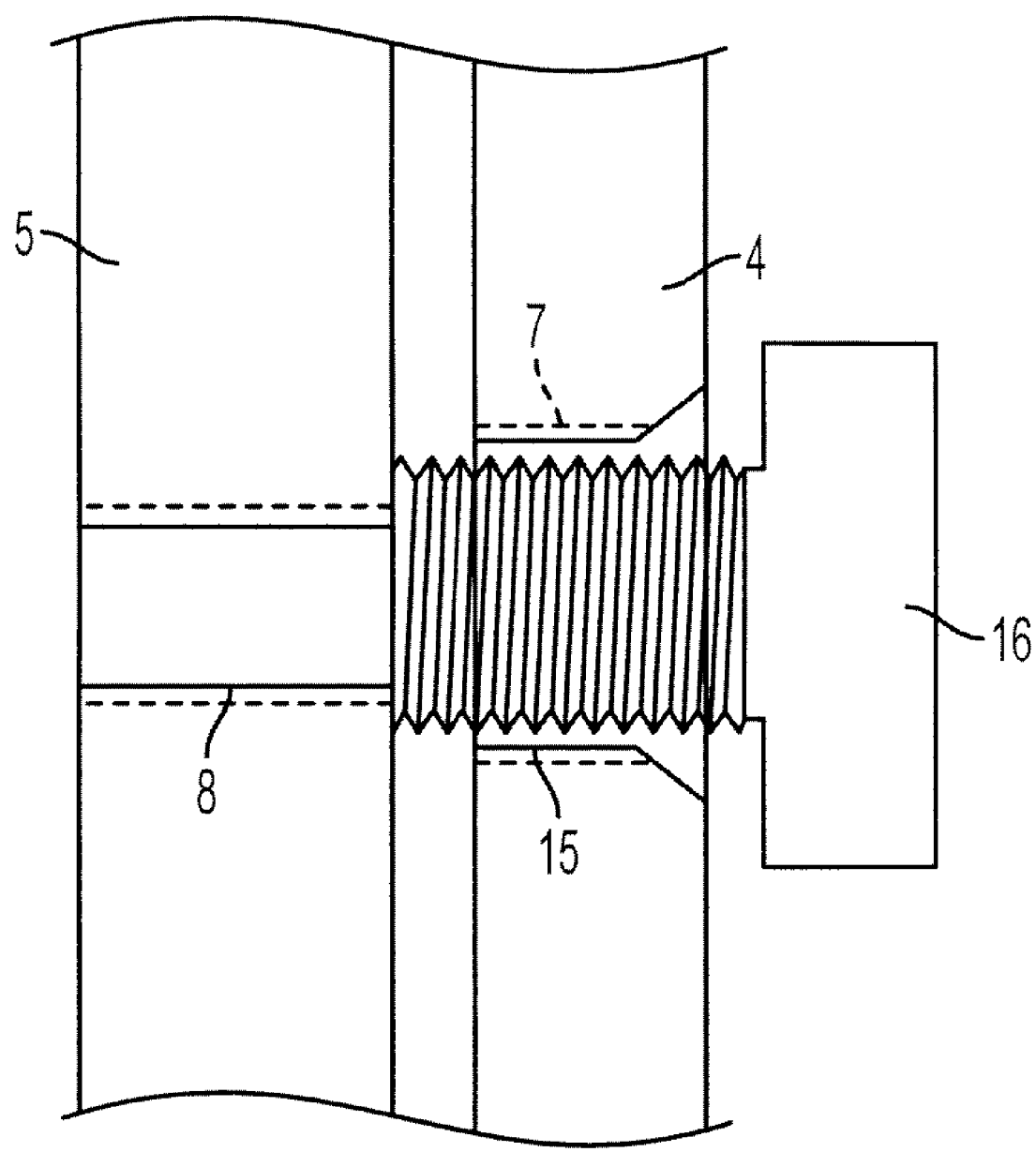
FIG. 4 is an enlarged side view in section of the disk brake assembly of FIG. 1 with a prying screw inserted into the countersink of the brake rotor in order to remove the rotor from the wheel hub.

FIG. 4 is an enlarged side view of the disk brake assembly of FIG. 1, with a prying screw 16 inserted into the countersink 15 to remove the brake rotor 1 from the wheel hub 2. The circular countersink 15 has the smooth, beveled outer portion 6 that leads to the threaded inner portion 7. The prying screw 16 is inserted into the threaded inner portion 7 of the countersink 15 until it presses against the hub flange 5. As the prying screw is rotated and fed further into the countersink 15, it continues to press against the hub flange 5 so that the rotor flange 4 is pushed away from and off of the hub flange 5. Certain embodiments of the present teachings contemplate the threaded inner portion 7 having a M10×1.5-6H thread to accommodate a M10×1.5 screw for the prying screw 16.

In accordance with further embodiments of the present teachings, the threaded inner portion 7 may be sized to accommodate additional types and sizes of prying screws 16. The prying screw may include any existing screw or bolt, such as, for example, a machine screw, machine bolt, or socket screw. The prying screw may further include any prospective spirally grooved, solid cylinder that can be used to remove the brake rotor from the wheel hub, as would be understood by one skilled in the art.

Because disk brake assemblies often need maintenance and repair, sometimes requiring the repair or replacement of the disk brake rotor, the present teachings further contemplate the use of replacement brake rotors. Certain embodiments of the present teachings consider adding the countersink 15 to an existing brake rotor to be used as a replacement rotor, while others contemplate newly manufacturing a brake rotor with the countersink 15 as a replacement part for the disk brake assembly of the present invention.

While the present invention has been disclosed in terms of exemplary embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a brake rotor" includes two or more different brake rotors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A disc brake assembly comprising:
a brake rotor including a rotor flange having a circular countersink extending through a thickness of the rotor flange, with a smooth, beveled outer portion for receiving a rotor retention screw in a recessed position, and a threaded inner portion for receiving a prying screw; and
a wheel hub including a hub flange having a circular bore for the rotor retention screw extending through a thickness of the hub flange, the circular bore having a threaded inner portion for receiving the rotor retention screw for securing the brake rotor to the wheel hub,
wherein a diameter of the inner portion of the circular countersink is larger then a diameter of the circular bore to allow insertion of the prying screw into the circular countersink but not into the circular bore.

2. The disk brake assembly of claim 1, wherein the diameter of the inner portion of the circular countersink is approximately 25 percent larger then the diameter of the circular bore.

3. The disk brake assembly of claim 1, wherein the outer portion of the circular countersink has a 90 degree bevel for receiving the rotor retention screw in a recessed position.

4. The disk brake assembly of claim 3, wherein the inner portion of the circular countersink has a M10×1.5-6H thread for receiving the prying screw.

5. The disk brake assembly of claim 4, wherein the circular bore has a M8×1.25-6H thread for receiving the rotor retention screw.

6. The disk brake assembly of claim 1, wherein the rotor retention screw is a flathead screw having a head and a threaded shaft, the head of the flathead screw being recessed in and engaging the outer portion of the circular countersink, and the threaded shaft engaging the circular bore for securing the brake rotor to the wheel hub.

7. The disk brake assembly of claim 6, wherein the rotor retention screw is a piloted, M8×20 mm flathead screw.

8. The disk brake assembly of claim 1, wherein the thickness of the rotor flange is 8 mm.

9. A method of securing a disk brake rotor to a wheel hub, comprising:
providing a brake rotor having a circular countersink adapted for receiving a rotor retention screw and a prying screw;
providing a wheel hub having a circular bore adapted for receiving the rotor retention screw;
aligning the circular countersink in the brake rotor with the circular bore in the wheel hub; and
inserting the rotor retention screw through the aligned holes so that a head of the rotor retention screw engages a smooth, beveled outer portion of the countersink, and a threaded shaft of the rotor retention screw engages the circular bore.

10. The method of claim 9, further comprising recessing the rotor retention screw in the smooth, beveled outer portion of the circular countersink.

11. The method of claim 9, wherein the outer portion of the circular countersink has a 90 degree bevel.

12. The method of claim 8, wherein the outer portion of the circular countersink leads to a threaded inner portion.

13. The method of claim 8, wherein a diameter of the threaded inner portion of the countersink is larger than a diameter of the circular bore for inserting the prying screw into the countersink but not into the circular bore.

14. The method of claim 12, wherein the diameter of the inner portion of the circular countersink is approximately 25 percent larger then the diameter of the circular bore.

15. A method for manufacturing a disk brake rotor that can be secured to a wheel hub, comprising:
fabricating a brake rotor including:
an annular flange having a wheel hub receiving surface adapted for abutting a wheel hub; and
a circular countersink extending through a thickness of the flange, with a smooth, beveled outer portion for receiving a rotor retention screw for securing the wheel hub against the wheel hub receiving surface of the flange, and a threaded inner portion for receiving a prying screw for ease of disassembly during service.

16. The method of claim 15, wherein a diameter of the threaded inner portion of the circular countersink is larger then a diameter of a corresponding circular bore in the wheel hub and is aligned with the circular bore in the wheel hub.

17. The method of claim 16, wherein the diameter of the inner portion of the countersink is approximately 25 percent larger then the diameter of the corresponding circular bore in the wheel hub.

18. The method of claim 15, wherein the outer portion of the countersink has a 90 degree bevel for receiving the rotor retention screw in a recessed position.

19. The method of claim 15, wherein the inner portion of the countersink has a M10×1.5-6H thread for receiving the prying screw.

20. The method of claim 15, wherein the thickness of the flange is 8 mm.

* * * * *